J. BECKER, Jr.
Running-Gear for Vehicles.

No. 159,630　　　　　　　　　　　　Patented Feb. 9, 1875.

WITNESSES:　　　　　　　　　　　　INVENTOR:
　　　　　　　　　　　　　　　　　　Jacob Becker Jr.
　　　　　　　　　　　　　　　　BY
　　　　　　　　　　　　　　　　　　ATTORNEYS.

UNITED STATES PATENT OFFICE.

JACOB BECKER, JR., OF SEYMOUR, INDIANA.

IMPROVEMENT IN RUNNING-GEARS FOR VEHICLES.

Specification forming part of Letters Patent No. 159,630, dated February 9, 1875; application filed November 27, 1874.

*To all whom it may concern:*

Figure 1:
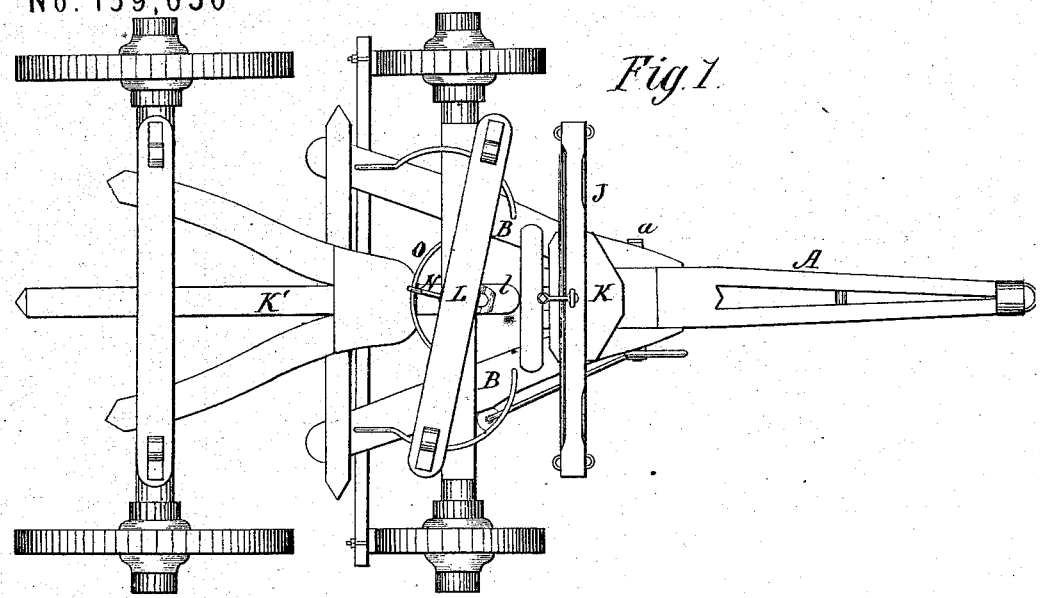
Figure 2:
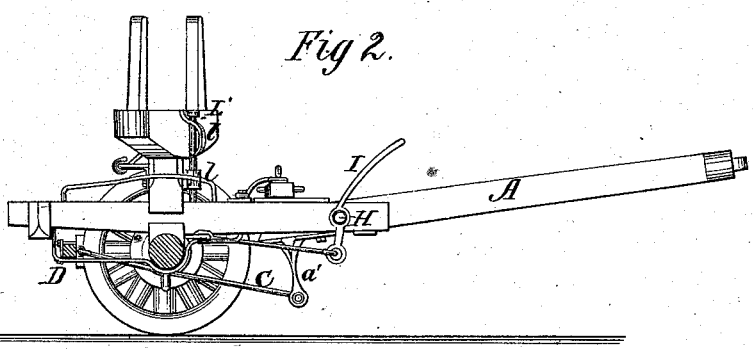
Figure 3:
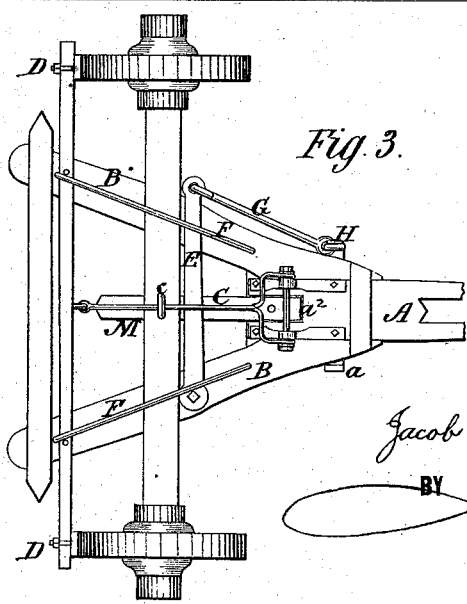

Be it known that I, JACOB BECKER, Jr., of Seymour, Jackson county, in the State of Indiana, have invented an Improved Wagon-Brake and Running-Gear, of which the following is a specification:

Figure 1 is a plan view; Fig. 2, a longitudinal vertical section; Fig. 3 a bottom view.

The invention will first be fully described, and then pointed out in the claims.

A represents the tongue, pivoted at $a$, and having pendent arms $a^1 a^1$, connected by a pin, $a^2$. The latter is connected with a brake-bar, D, by a rod, C, which passes through the guide-loop $c$ on the bottom of front axle. As the team holds back the tongue rises, and thus actuates the brakes automatically, instead of doing it, as is now usual, by special mechanism worked by hand. E is a bar, pivoted to one hound, and sliding over bars F F, so as to come beneath the rear end of tongue, and prevent it from turning or operating the brakes when the horses back. The bar E may be worked by the driver through a rod, G, connecting its free end with a loop on the crank-arm of a rock-shaft, H, and by the long-handled hook-rod I. Again, I pivot the double-tree J in a plate, K, that connects the two hounds B B, the pivot passing down through rear bifurcations of the tongue. It is thus made independent of the tongue, and unaffected by its movements. I also couple the reach by passing the king-bolt L through front loops, $l' l'$, of bolster, sand-board, and plate M, whereby I make the connection and disconnection safe and convenient. The bolster is prevented from rocking by a hook, N, working in a circular iron that projects from the rear of sand-board.

Having thus described all that is necessary to a full understanding of my invention, what I claim as new is—

1. The combination, with tongue A, pivoted at $a$, and having arms $a^1$, connected by pin $a^2$, of the rod C, connecting with brake-bar, as and for the purpose specified.

2. The combination, with pivoted tongue A, of bars F F and sliding bar E, as and for the purpose described.

3. The combination of plate K and the double-tree J, pivoted over hounds, as and for the purpose set forth.

4. The loops $l'$ and plate M, combined with a king-bolt, reach, sand-board, bolster, and front axle, as and for the purpose specified.

5. The combination of a bolster, L, to turn on a pivot, L', of the hook N, to work in a circular iron, O, as and for the purpose described.

JACOB BECKER, JR.

Witnesses:
    WILLIAM JOHNSON,
    D. W. JOHNSON.